US010206109B2

(12) United States Patent
Sudi et al.

(10) Patent No.: US 10,206,109 B2
(45) Date of Patent: Feb. 12, 2019

(54) OFFLINE ACCESS NETWORK DISCOVERY AND SELECTION FUNCTION (ANDSF) PROVISIONING USING NEAR FIELD COMMUNICATIONS (NFC)

(71) Applicant: Intel Corporation, Santa Clara, CA (US)

(72) Inventors: Krishna Chaitanya Sudi, Bangalore (IN); Anshu Agarwal, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 14/872,096

(22) Filed: Sep. 30, 2015

(65) Prior Publication Data

US 2016/0192195 A1 Jun. 30, 2016

(30) Foreign Application Priority Data

Dec. 24, 2014 (IN) .......................... 6527/CHE/2014

(51) Int. Cl.
*H04W 12/08* (2009.01)
*H04W 4/50* (2018.01)
*H04W 4/80* (2018.01)
*H04W 48/14* (2009.01)
*H04W 48/16* (2009.01)
*H04W 72/04* (2009.01)
*H04W 72/08* (2009.01)

(52) U.S. Cl.
CPC ............. *H04W 12/08* (2013.01); *H04W 4/50* (2018.02); *H04W 4/80* (2018.02); *H04W 48/14* (2013.01); *H04W 48/16* (2013.01); *H04W 72/0493* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 7,006,828 | B1* | 2/2006 | Czaja | H04W 36/18 370/328 |
| 9,078,123 | B1* | 7/2015 | Benco | H04W 24/04 |
| 2002/0103010 | A1* | 8/2002 | Thomas | H04W 24/00 455/560 |
| 2009/0239570 | A1* | 9/2009 | Koyanagi | H04W 36/0077 455/525 |
| 2010/0091651 | A1* | 4/2010 | Chin | H04L 47/805 370/230 |
| 2010/0248738 | A1* | 9/2010 | Chayat | H04W 48/16 455/453 |
| 2012/0081557 | A1* | 4/2012 | Kupinsky | H04L 12/1407 348/207.1 |

(Continued)

FOREIGN PATENT DOCUMENTS

WO 2013134669 A1 9/2013

OTHER PUBLICATIONS

Office Action dated Jul. 23, 2018 for Chinese Patent Application No. 201510789714.X.

*Primary Examiner* — Saleh Najjar
*Assistant Examiner* — Devin E Almedia
(74) *Attorney, Agent, or Firm* — Schiff Hardin LLP

(57) ABSTRACT

Described herein are architectures, platforms and methods for obtaining a subscriber policy by a no-data-connectivity portable device to have wireless connectivity using a non-3GPP network.

18 Claims, 5 Drawing Sheets

(56) References Cited

U.S. PATENT DOCUMENTS

| | | | |
|---|---|---|---|
| 2013/0155849 A1* | 6/2013 | Koodli | H04L 45/308 370/230 |
| 2013/0235747 A1* | 9/2013 | Le | H04W 24/08 370/252 |
| 2014/0016613 A1* | 1/2014 | Chan | H04W 36/18 370/331 |
| 2014/0057558 A1 | 2/2014 | Cooper | |
| 2014/0092731 A1* | 4/2014 | Gupta | H04W 52/0258 370/229 |
| 2014/0187252 A1 | 7/2014 | Gupta et al. | |
| 2014/0206353 A1* | 7/2014 | Kim | H04W 36/14 455/436 |
| 2014/0207974 A1* | 7/2014 | Pulipakkam | G06F 9/4411 710/11 |
| 2015/0089586 A1* | 3/2015 | Ballesteros | H04W 12/08 726/3 |
| 2015/0117406 A1* | 4/2015 | Kim | H04W 36/0022 370/331 |
| 2016/0183180 A1* | 6/2016 | Garcia | H04W 4/18 370/328 |
| 2017/0078905 A1* | 3/2017 | Kasslin | H04W 48/20 |
| 2017/0332279 A1* | 11/2017 | Kobayashi | H04W 28/16 |

* cited by examiner

OFFLINE ACCESS NETWORK DISCOVERY AND SELECTION FUNCTION (ANDSF) PROVISIONING USING NEAR FIELD COMMUNICATIONS (NFC)

BACKGROUND

In present mobile communication specifications, such as 3GPP specification, the Access Network Discovery and selection function (ANDSF) may be used to download operator policies for mobile handsets. For example, ANDSF servers may be deployed by operators centrally or in different geographical locations. A user may purchase a subscription policy from the operators and in addition, the user's mobile device needs to have Open Mobile Alliance Device Management (OMA DM) framework in order to download the operator policies. With the deployed ANDSF server, the mobile device may establish connection by providing its geographical location information, and afterwards downloads the operator policies through the OMA DM framework. In another example, the operator policies may be downloaded through over the air (OTA) framework as well.

In the examples described above, smaller operators may find the deployment of the ANDSF servers and the use of the OMA DM framework to be expensive. Furthermore, the user may not have a data plan subscription with cellular network operators and to this end, there is a need to facilitate efficient wireless connectivity to mobile handsets such as those without data plan subscription.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for obtaining ANDSF policy by a no-data-connectivity portable device to have wireless connectivity using a non-3GPP network. For example, the portable device has no data connectivity and it uses a NFC or Bluetooth feature to receive a subscriber policy from another device such as a policy-tag station. In this example, the subscriber policy includes an access-authorization that is pre-configured to include a limitation that corresponds to subscribed feature(s) as subscribed into by a user of the portable device.

For example, the user subscribed to a particular subscriber policy that is being offered for a particular sporting event, place and time period. In this example, the no-data-connectivity portable device (i.e., registered portable device for the subscriber policy) may receive the subscriber policy from the policy-tag station that may be physically located in the sporting event. The subscriber policy may include the access-authorization that is pre-configured to allow the no-data-connectivity portable device to gain access of an available wireless network during the particular sporting event, place and time period.

In an implementation, the available wireless network may include multiple hotspots or access points such as a first hotspot and a second hotspot. In this implementation, the portable device may connect to the first hotspot by default, and afterwards, the portable device may be dynamically transferred to the second hotspot when a measured carrier traffic load and quality of service (QOS) for the first hotspot is below a pre-configured threshold level.

Figure 1:
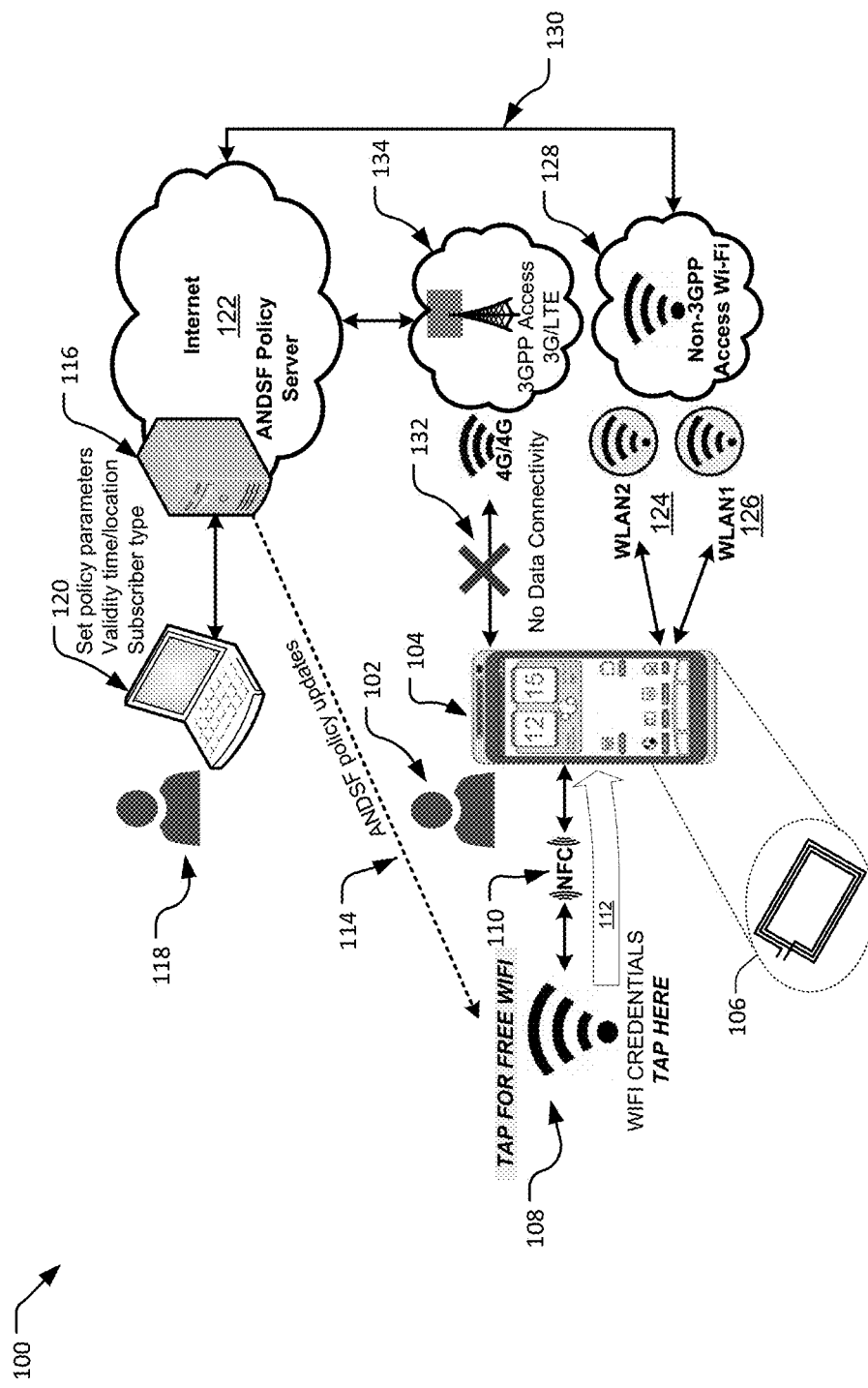
FIG. 1 is an example scenario that illustrates a wireless connectivity arrangement as described in present implementations herein.

FIG. 1 is an example scenario 100 that illustrates obtaining of a subscriber policy by a no-data-connectivity portable device to have wireless connectivity as described in present implementations herein. For example, the wireless connectivity arrangement facilitates wireless communications between the no-data-connectivity portable device and another mobile device, or another communications network. In this example, an NFC feature or a Bluetooth feature of the no-data-connectivity portable device may be utilized to download a ANDSF policy (i.e., subscriber policy) and the downloaded ANDSF policy may facilitate an access-authorization to connect, for example, with a wireless network such as a Wi-Fi hotspot or access point. The Wi-Fi hotspot or access point may then connect the no-data-connectivity portable device to the other mobile device or communications network.

As shown, the example scenario 100 may include a mobile user 102 using a portable device 104 that includes a coil antenna 106, a policy-tag station 108 that utilizes an NFC link 110 to transfer a ANDSF policy 112 to the portable device 104, aANDSF policy updates 114 from aANDSF policy server 116, a server operator 118 that uses, for example, a second portable device 120 to configure the ANDSF policy updates 114, and an Internet 122. Furthermore, the scenario 100 includes a first hotspot or access point 124 (hereinafter referred to as first hotspot 124) and a second hotspot or access point 126 (hereinafter referred to as second hotspot 126) for a Wi-Fi network 128, and a physical Ethernet connection 130 that connects the Wi-Fi network 128 to the Internet 122. Furthermore still, the scenario 100 shows a no-data connectivity link 132 between the portable device 104 and a base station 134, which may provide cellular network communications for the portable device 104.

In an implementation, the ANDSF policy 112 may include encrypted data packets that contain an access-authorization information in order to authorize and allow the portable device 104 to discover and connect, for example, to non-3GPP access networks such as the Wi-Fi or WiMAX networks. In this implementation, the portable device 104 may utilize these non-3GPP access networks as additional mode of obtaining wireless connectivity for data communications—in addition to the 3GPP access networks such as a high speed packet access (HSPA) or an LTE for LTE enabled portable devices. In this manner, the ANDSF policy may be utilized to minimize carrier traffic load congestions in the 3GPP access networks and may further facilitate the transfer of these carrier traffic load to the non-3GPP networks.

As shown, the portable device 102 may align and direct its coil antenna 106 when tagging or tapping to the policy-tag station 108. That is, the coil antenna 106 and an other coil antenna (not shown) of the policy-tag station 108 may engage in mutual induction to establish near field coupling and provide the NFC link 110.

Through the NFC link 110, the ANDSF policy 112 (i.e., subscriber policy) may be transmitted from the policy-tag station 108 to the portable device 104, which may have no data connectivity feature as illustrated. The access-authorization in the ANDSF policy 112, for example, may now define the extent or limit to which the portable device 104 may access the wireless network Wi-Fi network 128. In this example, the extent or limit may be based upon subscriber policy features that the user 102 may have subscribed to through the ANDSF policy server 116.

For example, the user 102 is a subscriber of the operator policy features that include limited access to the first hotspot 124 and the second hotspot 126 of the Wi-Fi network 128. The limited access, for example, includes a three-hour access-period (e.g., 7-10 PM) for a particular day (e.g., Friday night) and in a particular location (e.g., soccer field for a soccer event) where the policy-tag station 108 is located. In this example, the access-authorization for the ANDSF policy 112 that is downloaded by the portable device 104 may be pre-configured to allow the portable device 104 to access the first hotspot 124 or the second hotspot 126 for the said period, day, and particular location.

As described herein, the portable device 104 may be configured to measure and determine a present carrier traffic loading and QOS between the first hotspot 124 and the second hotspot 126. Based from the determined carrier traffic loading and QOS, the portable device 104 may be configured to transfer connection from one hotspot to another hotspot. Alternatively, the portable device 104 may receive this present carrier traffic load and QOS information from the Wi-Fi network 128.

For example, during the period that the portable device 104 is connected to the first hotspot 124, the determined carrier traffic and QOS are below a pre-configured threshold level and as such, the portable device 104 may transfer and connect to the second spot 126, which may have a lighter traffic load and better QOS as compared to the first hotspot 124. Although the scenario 100 illustrates a limited number of hotspots, the Wi-Fi network 128 may include multiple other hotspots or access points in addition to the first hotspot 124 and second hotspot 126. Similarly, the access-authorization implementation as described above may apply to these additional hotspots.

With continuing reference to FIG. 1, the portable device 104 is an ANDSF enabled portable device 104 that includes, but is not limited to, an Ultrabook, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. On the other hand, the policy-tag station 108 may include a transceiver circuitry and a storage (not shown) to relay the ANDSF policy 112 to authorized subscribers. In other implementations, the policy-tag station 108 may be similar to the portable device 104 although it may be directly connected to the ANDSF policy server 116 and need not be a no-data connective portable device as illustrated for the portable device 104 above. In this other implementation, the policy-tag station 108 may utilize its Bluetooth (BT) feature to transmit the ANDSF policy 112 to the portable device 104.

In an implementation, the policy-tag station 108 may receive ANDSF policy updates 114 that may include updates for the subscriber policies. For example, another user 102 subscribed an operator policy to watch the soccer game as illustrated above. In this example, the server operator 118 may utilize the second portable device 120 to pre-configure subscriber policy parameters such as validity, time, and location of access-authorization. These pre-configured policy parameters that may correspond to the newly subscribed operator policy may be forwarded to the policy-tag station 108. In this manner, the other user 102 may use his no-data connectivity mobile device (e.g., ANDSF enabled portable device 104) to gain access to the Wi-Fi network 128.

In the example above, the subscriber policy parameters for one particular location may be different from another geographical location. In other words, the downloaded ANDSF policy 112 as described above may not apply to another Wi-Fi network (not shown) in another geographical location. In this other geographical location, the user 102 may be required to subscribe to another operator policy (i.e., ANDSF policy 112) to obtain access-authorization.

In an implementation, FIG. 1 may not be limited to the Wi-Fi network 128. Similar other wireless communication technologies that offer distinct wireless connections such as the WiMAX technology may be utilized. In this other wireless communication technologies, the portable device 104 may utilize multiple hotspots and is not limited to a single connection at a time for user convenience. These multiple hotspots, for example, may facilitate data communications between the portable device 104 and the Internet 122 through the physical Ethernet connection 130.

Figure 2:
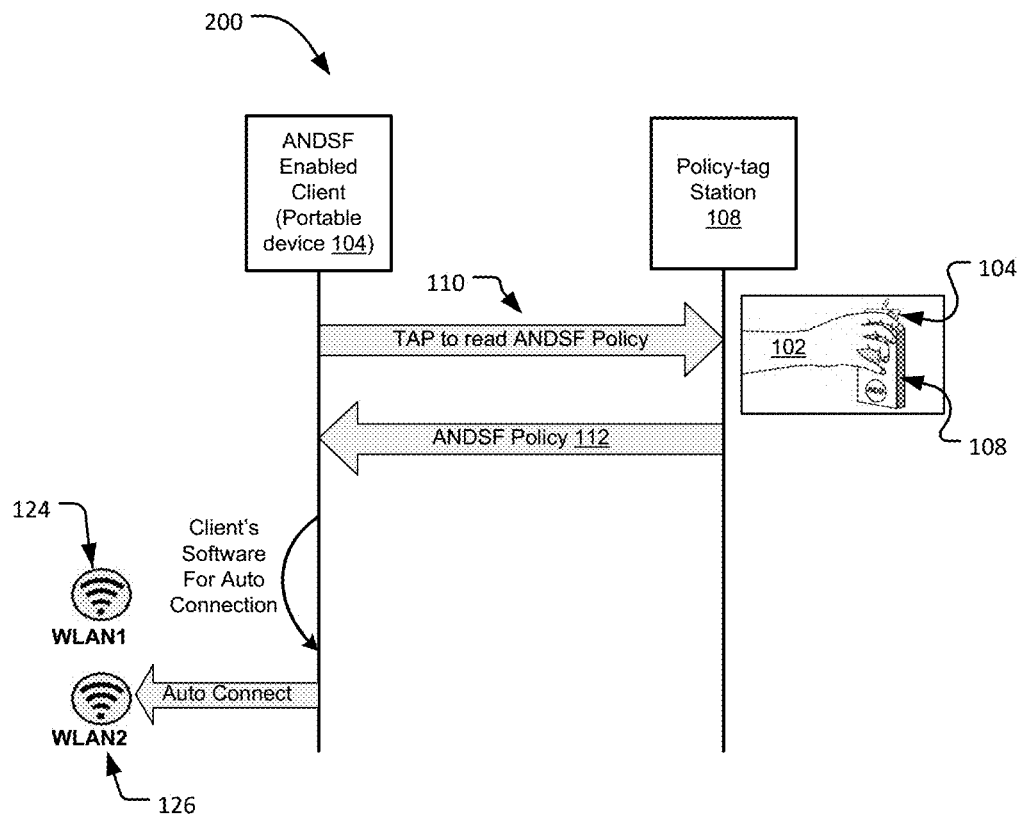
FIG. 2 illustrates an example sequence diagram depicting a process of obtaining the ANDSF policy by a no-data-connectivity portable device as described in present implementations herein.

FIG. 2 illustrates an example sequence diagram 200 that depicts a process of obtaining the ANDSF policy 112 by a no-data-connectivity portable device 104 as described in present implementations herein.

As shown, FIG. 2 shows a minimal step in obtaining the ANDSF policy 112 when the user 102 enters, for example, the venue for the soccer event at a particular time and location as exemplified in FIG. 1 above. For example, the user 102 taps his portable device 102 to the policy-tag station 108 and afterward, the ANDSF policy 112 is transferred to the portable device 102. In this example, the portable device 102 may include a software, firmware, hardware, software, or a combination thereof, to control an operation of its transceiver circuitry to auto-connect to the first hotspot 126 as shown.

Figure 3:
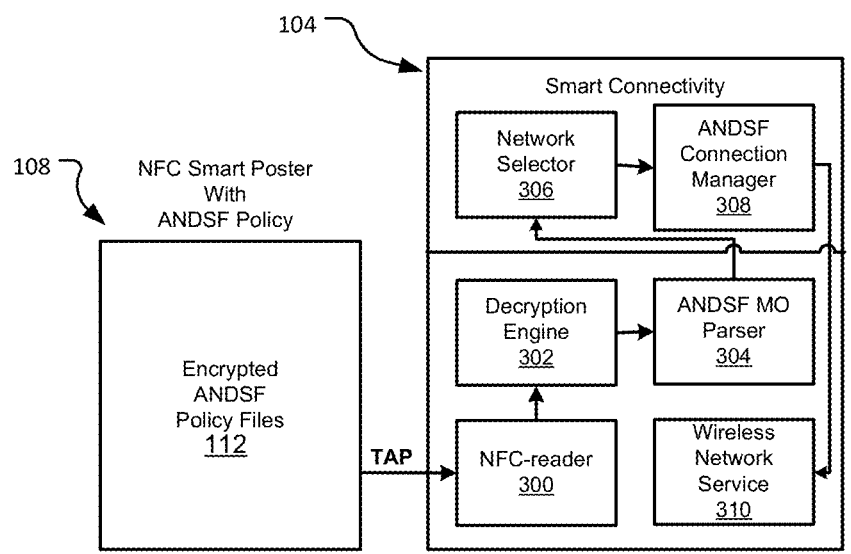
FIG. 3 is an example system block diagram of a receiver circuitry of the portable device as described in present implementations herein.

FIG. 3 illustrates an example system block diagram of a receiver circuitry of the portable device 104 as described in present implementations herein. As shown, the example receiver circuitry of the portable device 104 may include a NFC-reader component 300, a decryption engine 302, a (ANDSF) management object (MO) parser 304, a network selector 306, a (ANDSF) connection manager 308, and a wireless network service 310.

Upon establishing the NFC link 110 as described in FIG. 2 above, the portable device 104 may receive the ANDSF policy 112 through its coil antenna 106 (not shown). With the received ANDSF policy 112, the NFC-reader component 300 may be configured to perform signal filtering and other receiver front-end signal processing of the received ANDSF policy 112. Afterwards, the filtered ANDSF policy 112 may be decrypted by the decryption engine 302.

In an implementation, the ANDSF policy 112 may be encrypted by the server operator in FIG. 1 to provide security to the ANDSF policy subscribers such as the user 102. In this manner, the ANDSF policy 112 for each portable device 104 may be distinct and independent from one another.

With continuing reference to FIG. 3, the management object (MO) parser 304 may be configured to determine and/or identify the access-authorization from the decrypted ANDSF policy 112. For example, as illustrated above, the user 102 is a subscriber of the ANDSF policy 112 that may allow the user 102 to use the no-data-connectivity portable device 104 to access the first hotspot 124 or the second hotspot within a particular period and time of day. In this example, the access-authorization for the particular ANDSF policy 112 may be pre-configured by the server operator 118 to facilitate user-access for the first hotspot 124 or the second hotspot 126 within the particular period and time of day as subscribed. The pre-configured access-authorization, for example, may be identified and/or determined by the MO parser 304.

Based on the identified access-authorization, the network selector 306 may be configured to select an initial hotspot to establish wireless connectivity between the portable device 104 and the Wi-Fi network 128. For example, the first hotspot 124 may be pre-configured as the default hotspot to establish connection. In this example, the network selector 306 may facilitate a connection transfer to the second hotspot 126 should the carrier traffic load and/or QOS of the first hotspot 124 reaches the threshold value.

For example, the threshold value includes a pre-configured value of the minimum carrier traffic load and/or QOS that the presently utilized default first hotspot 104 may satisfy to maintain the wireless connectivity. Otherwise, the network selector 306 may initiate wireless connectivity transfer to the second hotspot 126 assuming that the access-authorization may allow access to the second hotspot 126.

After the network selector 306 has selected the hotpot to utilize based on the identified access-authorization, the ANDSF connection manager 308 may be configured to prepare and coordinate with other components of the transceiver circuitry of the portable device 104 for data communication through the selected hotspot. For example, the ANDSF connection manager 308 may set up the data rates, type of modulation to use, particular frequency to use, and the like, for the particular wireless connectivity. In this example, the wireless network service 310 may implement the data rates, type of modulation to use, etc. for the wireless connectivity between the no-data connectivity portable device 104 and the wireless network 128.

Figure 4:
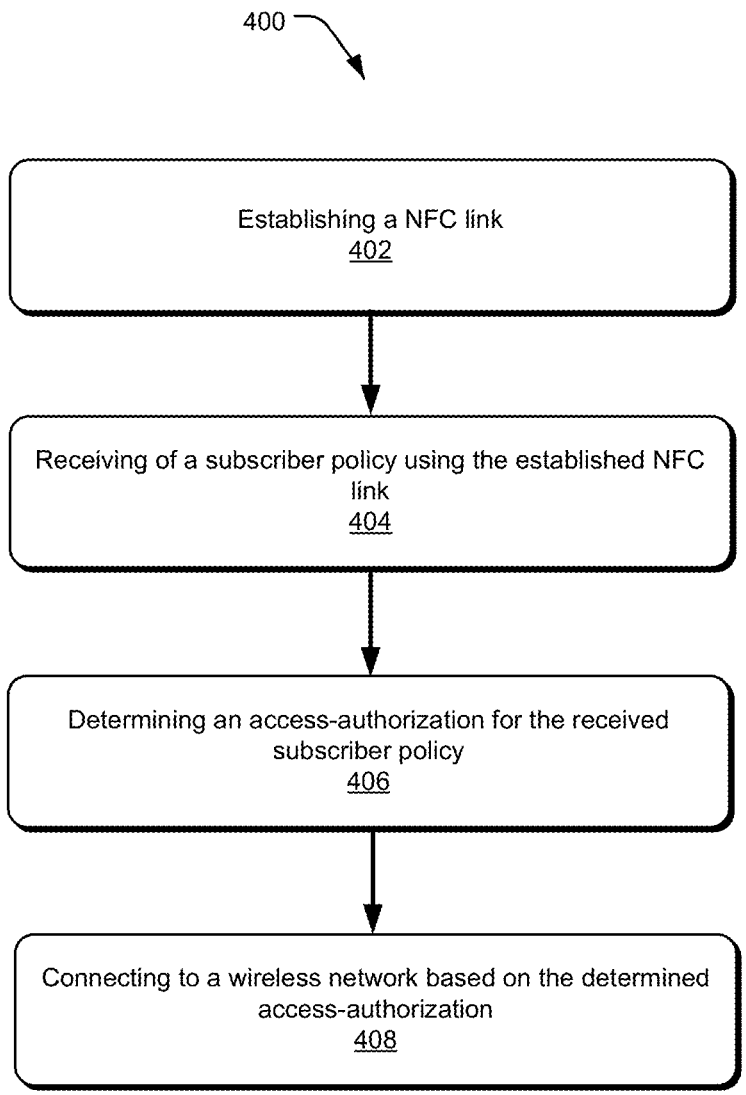
FIG. 4 is an example process chart illustrating an example method for obtaining wireless connectivity in a NFC-based portable device.

FIG. 4 shows an example process chart 400 illustrating an example method for obtaining wireless connectivity in a NFC-based portable device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, establishing a NFC link is performed. For example, the portable device 104 may be configured to establish the NFC link 110 between the portable device 104 and the policy-tag station 108. In this example, the coil antenna 106 of the portable device 104 may operate at a carrier frequency signal of 13.56 MHz and the mutual induction between the coil antenna 106 and the coil antenna of the policy-tag station 108 may provide the NFC link 110.

At block 404, receiving of a subscriber policy using the established NFC link is performed. The subscriber policy, for example, includes the ANDSF policy that the user has subscribed previously. In this example, the ANDSF policy such as the ANDSF policy 112 is encrypted to provide security during the ANDSF updates and delivery of the ANDSF policy 112 to the portable device 104. The portable device 104 may include the decryption engine 302 that may be configured to decrypt the received ANDSF policy 112.

In other implementations, the subscriber policy may include other operator specific policies and is not limited to the ANDSF policy as described above. For example, non-3GPP operators such as WiMAX, iBurst, Hiperman, UMTS-TDD, etc. may have their own specific operator policies. In this example, the subscriber policy as described in present implementations herein may include these non-3GPP operator policies as well.

At block 406, determining an access-authorization for the received subscriber policy is performed. For example, the MO parser 304 may be utilized to determine and/or identify the access-authorization that is included in the received subscriber policy. The access-authorization, in this example, may allow the user 102 through the portable device 104 to access the first hotspot 124 and/or the second hotspot 126 within a time period and in particular geographical location.

At block 408, connecting to a wireless network is performed. For example, the wireless network 128 is a Wi-Fi network that includes the first hotspot 124 and the second hotspot 126. In this example, the present carrier traffic and the QOS between the first hotspot 124 and the second hotspot 126 may first be determined by the network selector 306 and afterward, the network selector 306 may select the first hotspot 124 or the second hotspot 126 for the wireless connectivity In another example, the first hotspot 124 may be utilized as the default hotspot and the portable device 104 may transfer connection to the second hotspot 126 based on the determined traffic load and QOS. In these examples, the wireless connectivity may be facilitated by the wireless network service 310 of the portable device 104.

Figure 5:
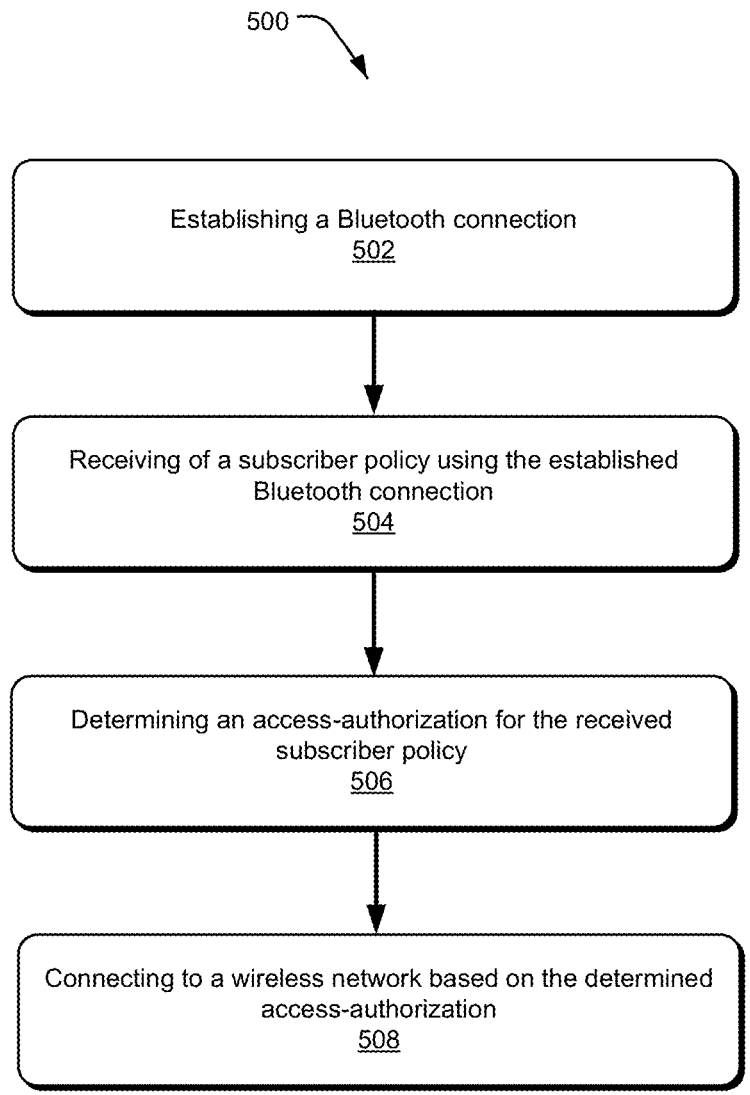
FIG. 5 is an example process chart illustrating an example method for obtaining wireless connectivity in a Bluetooth-based portable device.

FIG. 5 shows an example process chart 500 illustrating an example method for obtaining wireless connectivity in a Bluetooth-based portable device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, establishing a Bluetooth link is performed. For example, the policy-tag station 108 includes a Bluetooth feature that may be utilized to transmit the ANDSF policy 112 to the portable device 104. In this example, the portable device 104 may first establish the BT link with the policy-tag station 108.

The rest of the blocks 504-508 may similarly adopt the description in blocks 404-408 above. However, for FIG. 5, the receiving of the subscriber polity (i.e., ANDSF policy 112) is facilitated by the established Bluetooth link rather than the established NFC link as discussed above.

The following examples pertain to further embodiments:

Example 1 is a method of near field communications (NFC)-based wireless connectivity in a device, the method comprising: establishing an NFC link; receiving a subscriber policy using the established NFC link, wherein the subscriber policy is pre-configured to include an access-authorization by the device; determining the access-authorization for the subscriber policy; and connecting to a wireless network based on the determined access-authorization.

In Example 2, the method as recited in Example 1, wherein the subscriber policy includes an Access Network Discovery and selection function (ANDSF) policy or a non-3GPP operator policy.

In Example 3, the method as recited in Example 2, wherein the access-authorization is pre-configured to include a limitation that corresponds to a subscribed feature of the ANDSF policy, wherein the limitation allows access within a particular geographical location, period, or time of day.

In Example 4, the method as recited in Example 1 further comprising decrypting of the subscriber policy.

In Example 5, the method as recited in Example 1, wherein the connecting to the wireless network includes connecting to a first hotspot or access point or a second hotspot or access point of the wireless network.

In Example 6, the method as recited in Example 5 further comprising determining a present carrier traffic and a quality of service (QOS) between the first hotspot or access point and the second hotspot or access point, wherein the connecting to the first hotspot or access point, or the second hotspot or access point is based upon the determined carrier traffic and QOS.

In Example 7, the method as recited in Example 6, wherein the determining of the present traffic and QOS includes comparing to a pre-defined threshold level for the present traffic and QOS.

In Example 8, the method as recited in Example 1, wherein the wireless network includes a non-3GPP network.

Example 9 is a device comprising: a coil antenna that is configured to establish a near field coupling link, wherein the coil antenna is further configured to receive a subscriber policy through the near field coupling link; a decryption engine that is configured to decrypt the received subscriber policy; a management object (MO) parser that is configured to identify an access-authorization of the decrypted subscriber policy; a network selector that is configured to determine a wireless network that corresponds to the identified access-authorization; and a wireless network service that is configured to connect the device to the wireless network.

In Example 10, the device as recited in Example 9, wherein the subscriber policy includes a non-3GPP policy.

In Example 11, the device as recited in Example 9, wherein wireless network includes a first hotspot or a second hotspot.

In Example 12, the device as recited in Example 11, wherein the network selector is further configured to determine a present carrier traffic and a quality of service (QOS) between the first hotspot and the second hotspot, wherein the network selector selects a connection to the first hotspot or the second hotspot based upon the determined carrier traffic and QOS.

In Example 13, the device as recited in Example 12, wherein wireless network service facilitates connection to the first hotspot or the second hotspot based upon the determined carrier traffic and QOS.

In Example 14, the device as recited in Example 9, wherein the near field coupling link includes a near field communications (NFC) link or a Bluetooth link.

In Example 15, the device as recited in Example 9, wherein the wireless network includes a non-3GPP network.

Example 16 is a method of near field communications (NFC)-based wireless connectivity in a device, the method comprising: establishing a NFC link; receiving an Access Network Discovery and selection function (ANDSF) policy using the established NFC link, wherein the ANDSF policy is pre-configured to define an access-authorization by the device; determining the access-authorization for the ANDSF policy; and connecting to a first hotspot or a second hotspot of a wireless network based on the determined access-authorization.

In Example 17, the method as recited in Example 16 further comprising determining a present carrier traffic and a quality of service (QOS) between the first hotspot and the second hotspot, wherein the connecting to the first hotspot or the second hotspot is based upon the determined carrier traffic and QOS.

In Example 18, the method as recited in Example 16, wherein the access-authorization is pre-configured to include a limitation that corresponds to a purchased feature of the ANDSF policy, wherein the limitation allows access within a particular geographical location, period, or time of day.

In Example 19, the method as recited in Example 16 further comprising decrypting of the subscriber policy.

In Example 20, the method as recited in Example 16, wherein the wireless network includes a non-3GPP network.

What is claimed is:

1. A method of near field communications (NFC)-based wireless connectivity in a device, the method comprising:
    establishing an NFC link;
    receiving a subscriber policy by the device through the established NFC link, wherein the subscriber policy includes an Access Network Discovery and selection function (ANDSF) policy and is pre-configured to include an access-authorization that allows the device to gain access to one or more of a plurality of hotspots;
    determining the access-authorization as defined by the subscriber policy;
    identifying the plurality of hotspots based on the determined access-authorization;
    accessing two or more of the plurality of hotspots;
    measuring, by the device, a carrier traffic load and quality of service (QOS) for the two or more of the plurality of hotspots; and
    selecting one of the plurality of hotspots based on the respective measured carrier traffic load and QOS of the two or more of the plurality of hotspots to connect to a wireless network through the selected one of the plurality of hotspots.

2. The method as recited in claim 1, wherein the access-authorization is pre-configured to include a limitation that corresponds to a subscribed feature of the ANDSF policy, wherein the limitation allows access within a particular geographical location, period, or time of day.

3. The method as recited in claim 1, further comprising decrypting of the subscriber policy.

4. The method as recited in claim 1, wherein the plurality of hotspots are separate access points that are located within the same geographical area.

5. The method as recited in claim 1, wherein the selecting one of the plurality of hotpots includes comparing the respective measured carrier traffic load and QOS of the two or more hotspots from among the plurality of hotspots to a pre-defined threshold level.

6. The method as recited in claim 1, wherein the wireless network includes a non-3GPP network.

7. The method as recited in claim 1, wherein receiving the subscriber policy through the established NFC link includes the device receiving the subscriber policy directly through the established NFC link.

8. A device, comprising:
a coil antenna that is configured to establish a near field coupling link, wherein the coil antenna is further configured to receive a subscriber policy through the near field coupling link, the subscriber policy including an Access Network Discovery and selection function (ANDSF) policy and being pre-configured to include an access-authorization that allows the device to gain access to one or more of a plurality of hotspots;
a decryption engine that is configured to decrypt the received subscriber policy;
a management object (MO) parser that is configured to identify the access-authorization as defined by the decrypted subscriber policy;
a network selector that is configured to:
identify a plurality of hotspots based on the identified access-authorization;
access two or more of the plurality of hotspots;
measure a carrier traffic load and quality of service (QOS) for the two or more of the plurality of hotspots; and
select one of the plurality of hotspots based on the respective measured carrier traffic load and QOS of the two or more of the plurality of hotspots to connect with a wireless network via the selected one of the plurality of hotspots; and
a wireless network service that is configured to connect the device to the wireless network.

9. The device as recited in claim 8, wherein the plurality of hotspots are access points that are located within the same geographical area.

10. The device as recited in claim 8, wherein the network selector is configured to measure the carrier traffic load and quality of service (QOS) for the two or more hotspots from among of the plurality of hotspots by comparing the measured carrier traffic load of the two or more hotspots to a pre-configured threshold value.

11. The device as recited in claim 8, wherein the near field coupling link includes a near field communications (NFC) link or a Bluetooth link.

12. The device as recited in claim 8, wherein the wireless network includes a non-3GPP network.

13. The device as recited in claim 8, wherein the coil antenna is further configured to receive the subscriber policy in the absence of data connectivity to cellular network communications.

14. A method of near field communications (NFC)-based wireless connectivity in a device, the method comprising:
establishing a NFC link;
receiving an Access Network Discovery and selection function (ANDSF) policy by the device through the established NFC link, wherein the ANDSF policy is pre-configured to define an access-authorization by the device that allows the device to gain access to one or more of a plurality of hotspots;
determining the access-authorization as defined by the ANDSF policy;
identifying a plurality of hotspots based on the determined access-authorization;
accessing two or more of the plurality of hotspots;
measuring, by the device, a carrier traffic load and quality of service (QOS) of the two or more of the plurality of hotspots; and
selecting one of the plurality of hotpots based on the respective measured carrier traffic load and QOS of the two or more of the plurality of hotspots to connect to a wireless network through the selected one of the plurality of hotspots.

15. The method as recited in claim 14, wherein the access-authorization is pre-configured to include a limitation that corresponds to a purchased feature of the ANDSF policy, wherein the limitation allows access within a particular geographical location, period, or time of day.

16. The method as recited in claim 14, further comprising decrypting of the subscriber policy.

17. The method as recited in claim 14, wherein the wireless network includes a non-3GPP network.

18. The method as recited in claim 14, wherein receiving the ANDSF policy through the established NFC link includes the device exclusively receiving the ANDSF policy through the established NFC link.

* * * * *